Oct. 18, 1932.  E. K. STANDISH  1,883,749
VARIABLE SPEED TRANSMISSION
Filed Jan. 14, 1931   2 Sheets-Sheet 1

INVENTOR.
Edward K. Standish

Oct. 18, 1932.  E. K. STANDISH  1,883,749
VARIABLE SPEED TRANSMISSION
Filed Jan. 14, 1931   2 Sheets-Sheet 2

INVENTOR.
Edward K. Standish

Patented Oct. 18, 1932

1,883,749

UNITED STATES PATENT OFFICE

EDWARD K. STANDISH, OF STOUGHTON, MASSACHUSETTS

VARIABLE SPEED TRANSMISSION

Application filed January 14, 1931. Serial No. 508,609.

This invention relates to a transmission mechanism of the infinitely variable type whereby a constant number of revolutions per minute imparted to the input or drive shaft may be easily, quickly, and quietly altered by a suitable outside control so that the speed of the output or driven shaft may be changed through a wide range while the mechanism is under a load; and a transmission which will carry a varying load efficiently and without excessive wear, and which is contained in a suitable case so that all parts are well lubricated.

The invention discloses certain new and useful improvements in a variable speed transmission of the friction plate and roll type having a plurality of contact points between the rolls and plates all adapted to carry a portion of the driving load without slippage, and means whereby the power transmitted through all the contact points between the rolls and plates is combined and utilized to drive the output shaft; also with means for increasing or decreasing the pressure between said contact points as the load varies, and means for securing adequate driving pressure, also means for reducing the speed of the output shaft and increasing its torque.

In the accompanying drawings Fig. 1 is a sectioned side elevation of the mechanism.

Figure 3:
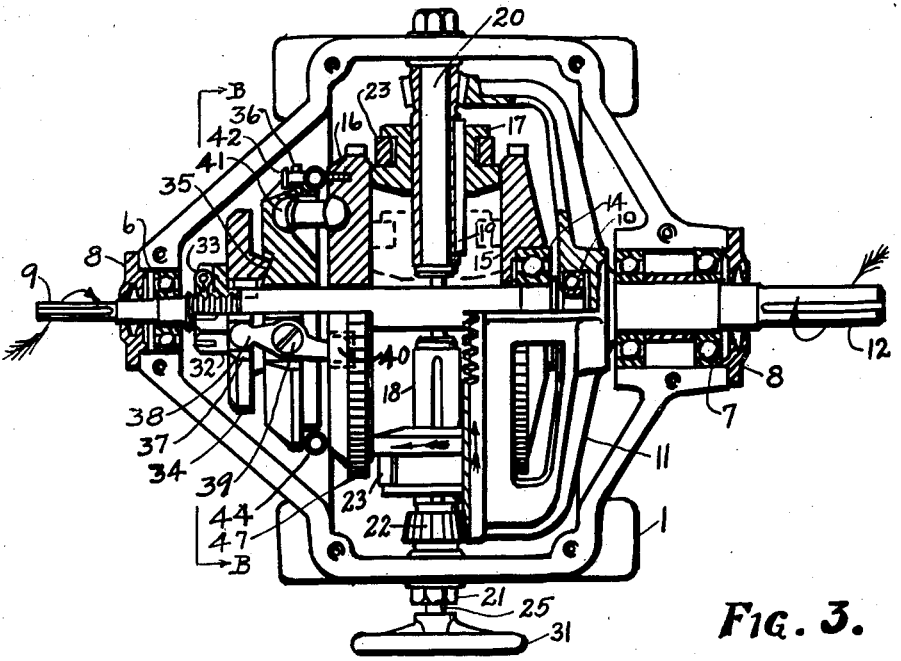
Fig. 3 is a top view with the case cover removed and with part of the drive shown in cross section.
Figures 4, 5:
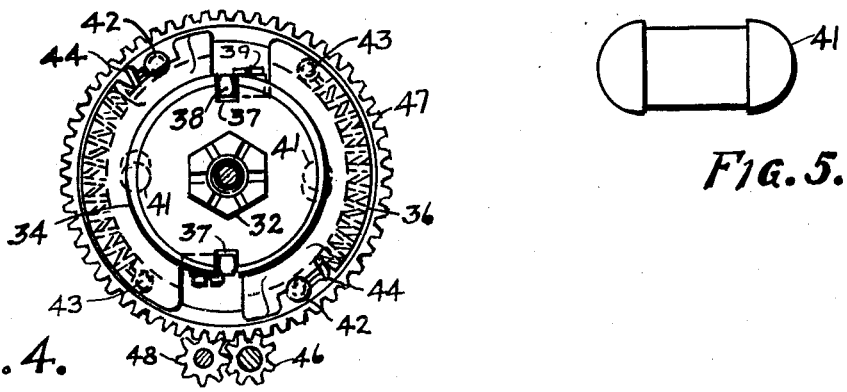

Fig. 4 discloses an end view without the casing and looking in the direction of the arrows, B—B in Fig. 3.

Fig. 5 is a detail of the thrust plug.

Similar numerals refer to similar parts throughout the drawings, and the relative rotation of the various moving parts are indicated by arrows.

Figure 1:
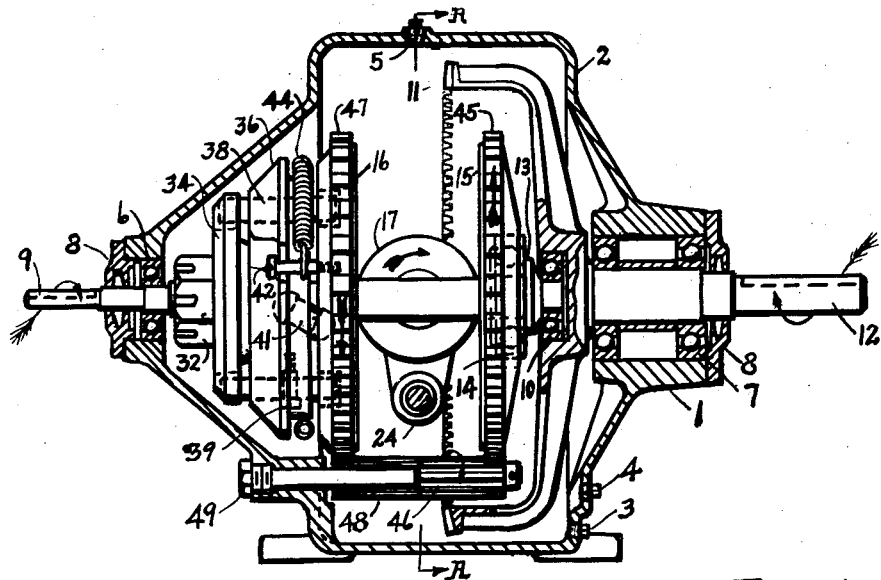
Figure 2:
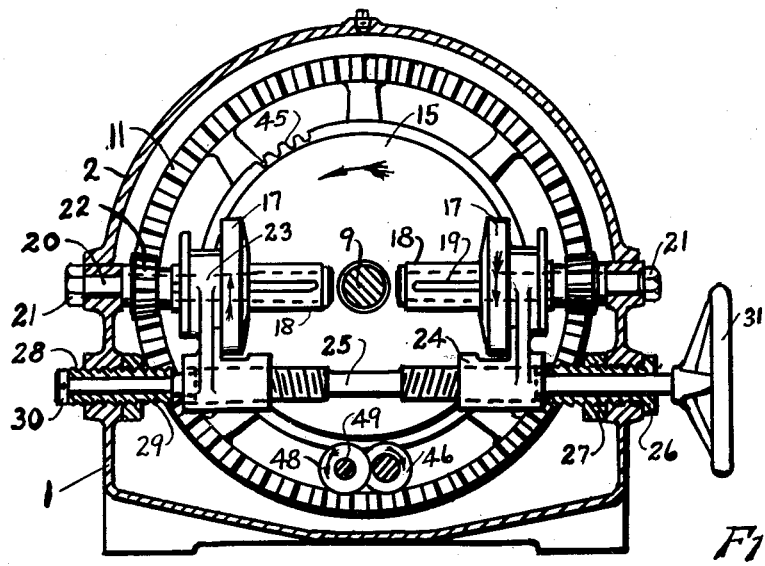
Fig. 2 is a cross section through Fig. 1 on lines A—A looking in the direction of the arrows.

In this embodiment of my invention the transmission, as shown in Figs. 1-2-3, is mounted in a suitable case 1 having a removable cover 2 to permit of easy access and assembly.

The case 1 has a drain plug 3, a second plug 4 to show the oil height, and the cover 2 has a filling plug 5.

At each end of case 1 are bearings 6 and 7, preferably of the ball or roller bearing type, and suitable bearing caps 8 are provided.

An input shaft 9 is mounted in the bearing 6 with its inner end suitably supported by a bearing 10 mounted in the hub of a bevel gear 11 which is attached to or a part of the output shaft 12. Both bearing 6 and bearing 10 are so mounted that the input shaft 9 is self-aligning endwise.

The input shaft 9 has an enlarged head 13 near its inner end against which rest a combined thrust and radial bearing 14 whose outer raceway rests in the plate 15.

Rotatably mounted on the input shaft 9 but not connected to it is the plate 16, and between plates 15 and 16 are mounted a plurality of rolls 17.

These rolls 17 contact with the surfaces of the plates 15 and 16 and are driven by both plates in a manner hereafter described.

In the particular construction shown the rolls 17, Figs. 2 and 3, are slidably mounted on sleeves 18 and provided with suitable splines or keys 19 so that both rolls and sleeves rotate together.

The sleeves 18 are in turn rotatably mounted on the studs or shafts 20 which are provided with enlarged heads at their inner ends and have their outer ends reduced to fit holes in the case 1 to which they are locked by the nuts 21.

The sleeves 18 are provided with bevel pinions or cog wheels 22 which mesh with the bevel gear or cog wheel 11.

The rolls 17 are provided with annular grooves in which are fitted suitable yokes 23 attached to or forming part of the adjustable levers 24 which are threaded through their hubs with right and left hand threads, respectively, and mounted on the screw shaft 25.

This screw shaft 25, Fig. 2, rests at one end in a bearing 26 which locks into the case 1 with a nut 27.

The bearing 26 extends into the case a sufficient length so as to act as a stop when the adjustable levers 24 are moved outward.

In order that the rolls 17 may be adjusted equally distant from the center of shaft 9 so as to prevent slippage and wear, the screw shaft bearing 28 is made adjustable in the case 1 and the screw shaft 25 has a reduced diameter 29 through this bearing and is provided at its outer end with a collar 30 to prevent end movement of the screw shaft in whatever position the bearing 28 is locked. An extension of either end of the screw shaft 25 can be made to fit a suitable handle 31 outside the case.

In this specific design the input shaft 9 is threaded for a nut 32, Figs. 3 and 4, which can be locked against turning by the cotter pin 33.

This nut 32 rests against a large washer or collar 34 which is keyed to the shaft 9 and which has a spherical seat 35 to permit of self-alignment of the thrust plate 36.

The washer or collar 34 may be provided with suitable slots 37 in which rest ends of the levers 38.

This lever 38 is shown as being hinged by suitable means such as the stud 39 to the thrust plate 36 and has its inner end preferably inserted into a slot 40 in the plate 16.

Between the plate 16 and the thrust plate 36 and preferably resting in spherical seats provided in each plate are a plurality of thrust or wedge plugs, 41, a detail of which is shown in Fig. 5. It will be evident that the end of the levers 38 could also rest in a spherical seat in plate 16 and that the thrust or wedge plugs 41 could be omitted for light loads, and that the use of the wedge plugs 41 is cheaper and more efficient than the use of cams to secure the required end thrust. Fastened to the rear of the plate 16, Figs. 1-3-4 are screws 42 having enlarged heads which overlap portions of the thrust plate 36 to assist at assembly and to limit the angular movement of the thrust plugs 41.

Fastened to the thrust plate 36 are studs 43 and between these studs and the screws 42 may be connected suitable springs 44, which act to maintain a normal thrust pressure between all the plates and rolls.

On the outer periphery of the plates 15 and 16 are gears or cog wheels 45 and 47, Figs. 1-2-4.

The gear or cog wheel 45 meshes with a pinion or cog wheel 46 and the gear 47 meshes with a pinion 48 while both pinions 46 and 48 are in mesh.

These pinions are mounted on suitable studs 49 which can be quickly removed to permit easy assembly.

The action of the transmission is as follows:

Power applied to the input shaft 9 is transmitted through the washer or collar 34 and the levers 38 to cause rotation of the thrust plate 36 and the plate 16 in the same direction as the input shaft, and at the same time to increase the end thrust between the plate 16 and the rolls 17 due to the wedging action of the thrust or wedge plugs 41.

By the use of these levers an increased load on the output shaft will be transmitted to plate 16 and thus cause an increased pressure between all plates and rolls, thus preventing slippage.

As the input shaft and all parts mounted thereon are permitted endwise alignment, pressure between the plate 16 and the rolls 17 is immediately equalized by pressure between the rolls 17 and the plate 15, and since both plates 15 and 16 are geared together through the pinions or cog wheels 46 and 48, and since the rolls 17 are all geared by cog wheels to the output shaft 12, therefore each contact point between roll 17 and plates 15 and 16 carries its share of the load, and the total power transmitted is proportional to the number of contact points.

To overcome any misalignment and to further insure equal distribution of pressure the thrust plate 36 presses against the washer 34 in a self-aligning cup 35. By adjusting the nut 32 on the input shaft 9, the angularity of the thrust plugs 41 may be altered to secure maximum pressure between the rolls and plates without jamming.

It is evident that by driving the plate 16 through some form of lever 38 the pressure between the rolls 17 and plates 15 and 16 is much more than if the thrust plate 36 was keyed either directly to the input shaft 9 or to the washer 34.

Obviously the essential features of this machine can be altered without departing from the scope of the invention. Therefore, without limiting myself to the precise construction shown, what I desire to secure by Letters Patent is the following:

I claim:

1. A variable speed transmission essentially comprising an input shaft, an output shaft, a plate freely mounted on the input shaft and flexibly driven thereby, a second plate parallel to the first plate, cog wheels connecting both plates and adapted to maintain the same speed of rotation between said plates at all times, a plurality of rolls connected to the output shaft by cog wheels and in contact with both plates, means for varying the speed of said rolls and output shaft, and means whereby the power transmitted through all the contact points between said rolls and plates is combined and utilized to drive the output shaft.

2. A variable speed transmission essentially comprising an input shaft, an output shaft, a plate freely mounted on the input shaft and flexibly driven thereby, a second plate parallel to the first plate and connected thereto by cog wheels, rolls connected to the output shaft by cog wheels and in contact with both plates, and means for varying the speed of said rolls and output shaft.

3. A variable speed transmission comprising an input shaft, an output shaft, two plates mounted on the input shaft and connected by cog wheels, a plurality of rolls connected by cog wheels to the output shaft and driven by said plates, means for varying the speed of said rolls and means for automatically varying the pressure between said rolls and plates, as the load on the output shaft varies.

4. A variable speed reduction mechanism comprising an input shaft, plates mounted thereon, rolls mounted to rotate between said plates in contact with a face of each, means for varying the position of the rolls from the center of the plates; gearing connecting said plates to maintain uniform speed, an output shaft, reduction gearing connecting the rolls and the output shaft, and means for varying the pressure between the rolls and plates as the load on the output shaft varies.

5. A variable speed transmission essentially comprising an input shaft, an output shaft, adjustable rolls adapted to vary the speed of the output shaft, a plate having its axis in line with the input shaft adapted to drive said rolls, a thrust plate located parallel to the roll drive plate, and a lever fulcrumed on said thrust plate having one arm in driving contact with the input shaft and the other arm in contact with the roll plate.

6. A variable speed transmission essentially comprising an input shaft, adjustable rolls adapted to vary the speed of the output shaft, a plate having its axis in line with the input shaft adapted to drive said rolls, a collar driven by said input shaft, a thrust plate located between said collar, and roll drive plate, a lever fulcrumed on the thrust plate in contact with the input shaft collar and roll drive plate and wedging means located between said thrust plate and roll plate.

7. A variable speed transmission comprising an input shaft, a collar driven by said shaft, a nut threaded to said shaft, for adjusting the collar, a self-aligning thrust plate resting against said collar, a roll driving plate parallel to said thrust plate, rolls in contact with the roll plate, a second roll plate on the opposite side of said rolls in contact therewith, gearing connecting said roll plates, an output shaft, gearing connecting the rolls and output shaft, means for adjusting and equalizing the position of the rolls across the face of the roll plates, means for equalizing the pressure between all rolls and roll plates, and wedging means for automatically varying this pressure as the load on the output shaft is varied.

8. A variable speed transmission essentially comprising an input shaft, a thrust plate mounted thereon, a roll driving plate mounted thereon parallel to said thrust plate, rolls in contact with the roll plate, a second roll plate on the opposite side of said rolls in contact therewith, gearing connecting the second roll plate to the first roll plate adapted to drive said second plate in the opposite direction to the first roll plate at the same speed, an output shaft, a separate gear independently connecting each roll with the output shaft, and wedging means for automatically varying the pressure between the rolls and roll plates as the driven load is varied.

9. A variable speed transmission essentially comprising an input shaft and an output shaft having their axis in line, two roll plates mounted with their axes in line with said shafts and having cogwheels connecting them together, rolls adjustably mounted on sleeves between said roll plates and frictionally driven thereby, a cogwheel mounted to rotate as a part of the output shaft, individual cogwheels on the outer end of each roll sleeve each in mesh with the output shaft cogwheel, and wedging means rotating with said roll plates adapted to alter the pressure between said rolls and plates as the driven load is varied.

10. A variable speed transmission essentially comprising a casing, a drive shaft, a driven shaft and two roll plates all mounted to rotate therein and having a common axis, said roll plates being geared together to rotate in opposite directions at the same speed, studs extending inwardly between said roll plates and fastened to said casing, a rotatable sleeve on each stud carrying at its outer end a bevel pinion, a roll slidably mounted on each sleeve and in frictional contact with both roll plates, a driven shaft bevel gear of larger diameter than said roll plates in mesh with each roll sleeve bevel pinion, and wedging means actuated by said drive shaft adapted to equalize the driving pressure between all roll plates and rolls and to vary said pressure as the load on the driven shaft varies.

11. A variable speed transmission essentially comprising an input shaft, driving plates having their axes in line with the input shaft, a cogwheel located outside said plates an output shaft having its axis in line with the input shaft and driven by said cogwheel individual cogwheels engaging said first mentioned cogwheel, variable speed rolls in contact with said plates and connected outside said plates and rolls by said individual cogwheels to the output shaft, and means for varying the points of contact between said rolls and plates to vary the speed of the output shaft.

EDWARD K. STANDISH.